US010594649B2

(12) United States Patent
Surcouf et al.

(10) Patent No.: US 10,594,649 B2
(45) Date of Patent: Mar. 17, 2020

(54) NETWORK CENTRIC ADAPTIVE BIT RATE IN AN IP NETWORK

(71) Applicant: Cisco Technology, Inc., San Jose, CA (US)

(72) Inventors: Andre Jean-Marie Surcouf, St Leu la Foret (FR); William Mark Townsley, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/094,949

(22) PCT Filed: Apr. 17, 2017

(86) PCT No.: PCT/US2017/027981
§ 371 (c)(1),
(2) Date: Oct. 19, 2018

(87) PCT Pub. No.: WO2017/184522
PCT Pub. Date: Oct. 26, 2017

(65) Prior Publication Data
US 2019/0124003 A1 Apr. 25, 2019

Related U.S. Application Data

(60) Provisional application No. 62/324,657, filed on Apr. 19, 2016, provisional application No. 62/324,710, (Continued)

(30) Foreign Application Priority Data

Jul. 19, 2016 (GB) .................................. 1612527.0

(51) Int. Cl.
*H04L 29/12* (2006.01)
*H04L 12/749* (2013.01)
(Continued)

(52) U.S. Cl.
CPC ........ *H04L 61/1511* (2013.01); *G06F 16/955* (2019.01); *H04L 12/2803* (2013.01);
(Continued)

(58) Field of Classification Search
CPC . H04L 61/1511; H04L 61/103; H04L 61/304; H04L 45/50; H04L 45/38;
(Continued)

(56) References Cited

U.S. PATENT DOCUMENTS

8,880,587 B2 * 11/2014 Cobb .................... H04L 65/605
709/203
9,106,962 B2 * 8/2015 Munetsugu ............ H04N 7/181
(Continued)

*Primary Examiner* — Brian T O Connor
(74) *Attorney, Agent, or Firm* — Merchant & Gould P.C.

(57) ABSTRACT

A method of serving a version of a piece of content from a server to a requesting node is described. A request for a piece of content is received from the requesting node. The request comprises an IP address associated with the requested content, the address including one or more portions relating to one or more parameters associated with the piece of content and at least one portion comprises anonymous bits. A plurality of versions of the requested piece of content are identified, each identified version having an IP address with portions matching the corresponding portions of the IP address of the request, except for the at least one portion comprising anonymous bits. The server then determines a version of the piece of content to send and sends the determined version to the requesting node.

20 Claims, 7 Drawing Sheets

Related U.S. Application Data filed on Apr. 19, 2016, provisional application No. 62/324,696, filed on Apr. 19, 2016, provisional application No. 62/324,727, filed on Apr. 19, 2016, provisional application No. 62/324,721, filed on Apr. 19, 2016, provisional application No. 62/340,156, filed on May 23, 2016, provisional application No. 62/340,182, filed on May 23, 2016, provisional application No. 62/340,162, filed on May 23, 2016, provisional application No. 62/340,174, filed on May 23, 2016, provisional application No. 62/340,166, filed on May 23, 2016.

(51) Int. Cl.

| | | |
|---|---|---|
| *H04L 12/745* | (2013.01) | |
| *H04L 12/747* | (2013.01) | |
| *H04L 29/08* | (2006.01) | |
| *H04L 12/28* | (2006.01) | |
| *H04L 29/06* | (2006.01) | |
| *H04N 21/2343* | (2011.01) | |
| *H04N 21/658* | (2011.01) | |
| *H04N 21/643* | (2011.01) | |
| *H04N 21/845* | (2011.01) | |
| *H04L 12/723* | (2013.01) | |
| *G06F 16/955* | (2019.01) | |
| *H04L 12/721* | (2013.01) | |
| *H04L 12/725* | (2013.01) | |
| *H04N 21/262* | (2011.01) | |
| *H04L 12/743* | (2013.01) | |
| *H04L 12/26* | (2006.01) | |
| *H04L 12/741* | (2013.01) | |
| *H04N 21/2662* | (2011.01) | |

(52) U.S. Cl.
CPC ........ *H04L 43/0876* (2013.01); *H04L 45/306* (2013.01); *H04L 45/34* (2013.01); *H04L 45/38* (2013.01); *H04L 45/50* (2013.01); *H04L 45/72* (2013.01); *H04L 45/741* (2013.01); *H04L 45/742* (2013.01); *H04L 45/745* (2013.01); *H04L 45/748* (2013.01); *H04L 45/7453* (2013.01); *H04L 45/7457* (2013.01); *H04L 61/103* (2013.01); *H04L 61/15* (2013.01); *H04L 61/2007* (2013.01); *H04L 61/251* (2013.01); *H04L 61/2503* (2013.01); *H04L 61/256* (2013.01); *H04L 61/304* (2013.01); *H04L 61/6059* (2013.01); *H04L 63/1416* (2013.01); *H04L 63/166* (2013.01); *H04L 63/168* (2013.01); *H04L 65/4084* (2013.01); *H04L 65/605* (2013.01); *H04L 67/02* (2013.01); *H04L 67/1002* (2013.01); *H04L 67/1008* (2013.01); *H04L 67/2823* (2013.01); *H04L 67/2842* (2013.01); *H04L 67/322* (2013.01); *H04L 67/327* (2013.01); *H04L 69/22* (2013.01); *H04N 21/23439* (2013.01); *H04N 21/26258* (2013.01); *H04N 21/64322* (2013.01); *H04N 21/6581* (2013.01); *H04N 21/845* (2013.01); *H04N 21/8456* (2013.01); *H04L 61/35* (2013.01); *H04L 65/4007* (2013.01); *H04L 65/602* (2013.01); *H04L 69/329* (2013.01); *H04L 2212/00* (2013.01); *H04N 21/2662* (2013.01)

(58) Field of Classification Search
CPC ... H04L 45/306; H04L 61/15; H04L 65/4084; H04L 61/2503; H04L 67/02; H04L 67/1008; H04L 45/745; H04L 45/72; H04L 61/2007; H04L 45/34; H04L 61/6059; H04L 65/605; H04L 67/322; H04L 67/1002; H04L 67/327; H04L 67/2823; H04L 45/7453; H04L 45/7457; H04L 61/251; H04L 43/0876; H04L 61/256; H04L 63/1416; H04L 63/166; H04L 63/168; H04L 69/22; H04L 45/741; H04L 45/748; H04L 45/742; H04L 67/2842; H04L 12/2803; H04L 65/602; H04L 61/35; H04L 65/4007; H04L 69/329; H04L 2212/00; H04L 12/2801; H04L 67/1097; H04L 12/56; H04L 45/74; H04L 45/64; H04L 61/1582; H04L 61/2528; H04L 61/10; H04L 61/6004; H04L 65/4069; G06F 16/955; H04N 21/26258; H04N 21/845; H04N 21/64322; H04N 21/8456; H04N 21/23439; H04N 21/6581; H04N 21/2662; H04N 19/40

See application file for complete search history.

(56) References Cited

U.S. PATENT DOCUMENTS

| | | | | |
|---|---|---|---|---|
| 9,344,517 | B2* | 5/2016 | Shivadas | H04L 67/2861 |
| 9,407,564 | B2* | 8/2016 | Major | H04N 21/25808 |
| 9,571,546 | B2* | 2/2017 | Nyberg | H04N 21/222 |
| 9,571,551 | B2* | 2/2017 | Brueck | H04L 29/06027 |
| 9,633,029 | B2* | 4/2017 | Lian | G06F 21/10 |
| 9,712,890 | B2* | 7/2017 | Shivadas | H04N 21/8455 |
| 9,769,536 | B2* | 9/2017 | Bergstrom | H04L 43/0882 |
| 9,860,572 | B2* | 1/2018 | van Deventer | H04N 21/218 |
| 9,906,597 | B2* | 2/2018 | Peelen | H04L 67/104 |
| 9,967,305 | B2* | 5/2018 | Braness | H04L 65/607 |
| 9,992,251 | B2* | 6/2018 | Surcouf | G06F 16/00 |
| 10,313,415 | B2* | 6/2019 | Surcouf | G06F 16/00 |
| 10,367,867 | B2* | 7/2019 | Annamraju | H04N 21/6437 |
| 10,462,537 | B2* | 10/2019 | Shivadas | H04N 21/2387 |
| 2011/0252082 | A1* | 10/2011 | Cobb | H04L 67/303 709/203 |
| 2012/0233345 | A1* | 9/2012 | Hannuksela | H04N 21/26258 709/231 |
| 2013/0191550 | A1* | 7/2013 | Hannuksela | H04N 21/23432 709/231 |
| 2013/0275616 | A1* | 10/2013 | Nyberg | H04N 21/222 709/231 |
| 2015/0304459 | A1* | 10/2015 | Pakula | H04L 67/02 709/203 |
| 2016/0021162 | A1* | 1/2016 | Surcouf | G06F 16/00 709/219 |
| 2016/0021400 | A1* | 1/2016 | Surcouf | G06F 16/00 725/93 |
| 2016/0182587 | A1* | 6/2016 | Annamraju | H04L 65/4084 709/219 |
| 2019/0199766 | A1* | 6/2019 | Basile | H04L 65/60 |
| 2019/0222619 | A1* | 7/2019 | Shribman | H04L 65/4084 |

\* cited by examiner

NETWORK CENTRIC ADAPTIVE BIT RATE IN AN IP NETWORK

TECHNICAL FIELD

The present disclosure relates generally to the use of adaptive bit rates in an IP network, in particular to the provision of content to nodes in an Internet Protocol version 6 network.

BACKGROUND

In classical content distribution systems, the node requesting content is responsible for selecting the content quality it receives. It will change the content quality it has requested based on the content (or lack thereof) that it receives. Specifically, the device switches between different available qualities based on some measurement of how long it takes to receive content of a given quality (or how long it takes to fill up its internal buffer). This is based on the assumption that the higher the quality, the bigger the content chunks and therefore the longer it takes to download the chunks when the network starts to become saturated.

The device therefore cannot anticipate any fast changing network conditions since it is always in a reactive mode.

BRIEF DESCRIPTION OF FIGURES

Embodiments of the method and apparatus described herein are illustrated in the Figures in which.

DETAILED DESCRIPTION

Overview

Described herein is a method of serving a version of a piece of content from a server to a requesting node. The method includes receiving at the server a request for the piece of content from the requesting node, wherein the request comprises an IP address associated with the requested content, wherein the IP address of the request includes one or more portions relating to one or more parameters associated with the piece of content and wherein at least one portion comprises anonymous bits. A plurality of versions of the requested piece of content are identified, wherein each identified version has an IP address with portions matching the corresponding portions of the IP address of the request, except for the at least one portion comprising anonymous bits. The server then determines a version of the piece of content to send and sends the determined version to the requesting node.

There is also described herein a method of advertising pieces of content to a network to allow the network to adapt the content served to changing network conditions. The method includes advertising an IP address associated with a piece of content, wherein the address comprises an IP address associated with the piece of content, wherein the address includes one or more portions relating to parameters associated with the piece of content and wherein at least one portion comprises anonymous bits. The anonymous bits are arranged to be interpreted by the network as allowing the network to serve any one of a plurality of versions of the piece of content, wherein each of the plurality versions has an IP address with portions matching the portions of the IP address of the request, except for the at least one portion comprising anonymous bits.

A method is also described of delivering a piece of content in response to a request. The method includes routing a request for a piece of content from a requesting node to a distribution cache wherein the distribution cache is arranged to store pieces of content having a preselected level of quality. The request comprises an IPv6 address associated with the piece of content and the IPv6 address includes a portion relating to parameters of the piece of content. A first piece of content having the preselected level of quality is served from the distribution cache to the user, irrespective of a quality requested by the user. Related pieces of content associated with the first piece are identified and at least one further version of the related pieces of content are sent to the distribution cache, the further version having a further quality.

Apparatus for implementing the methods described, including network nodes, computer programs, computer program products, computer readable media and logic encoded on tangible media for implementing the method are also described Example Embodiments Networks such as local area networks and wide area networks can be implemented between nodes or network devices and are often utilised for distributing data for storage within the network device and for later retrieval of that data. One example of a wide area network is the internet. Nodes of the network may request data from one another. They can do this in one of two ways they can either address a request to another node, the request including details of the data being requested, or they can address a request directly to the required data.

The network forming the internet is made up of a large number of interconnected nodes. These nodes include clients, switches, servers, routers and other such devices and the nodes can communicate using many different protocols at different layers of the OSI model, but in particular the Internet Protocol version 4 (IPv4) communications protocol. Nodes in the network can be addressed using static or dynamic IPv4 addresses, some of which are globally-reachable but many of which are specific to a local network segment Internet Protocol version 6 (IPv6) has greatly increased the number of available Internet Protocol (IP) addresses, enabling IP addresses to be utilised in a different way. IPv6 addresses contain 128 bits and the number of unique IPv6 addresses is therefore significantly greater than for 32-bit IPv4 addresses. This means that content, in addition to nodes, can have an IP address; in fact, each data item, whether it is a page, article or piece of multimedia content can have its own IP address. This means that rather than traffic being addressed to a specific node, traffic can now be alternatively or additionally addressed to a particular piece of content.

Figure 1:
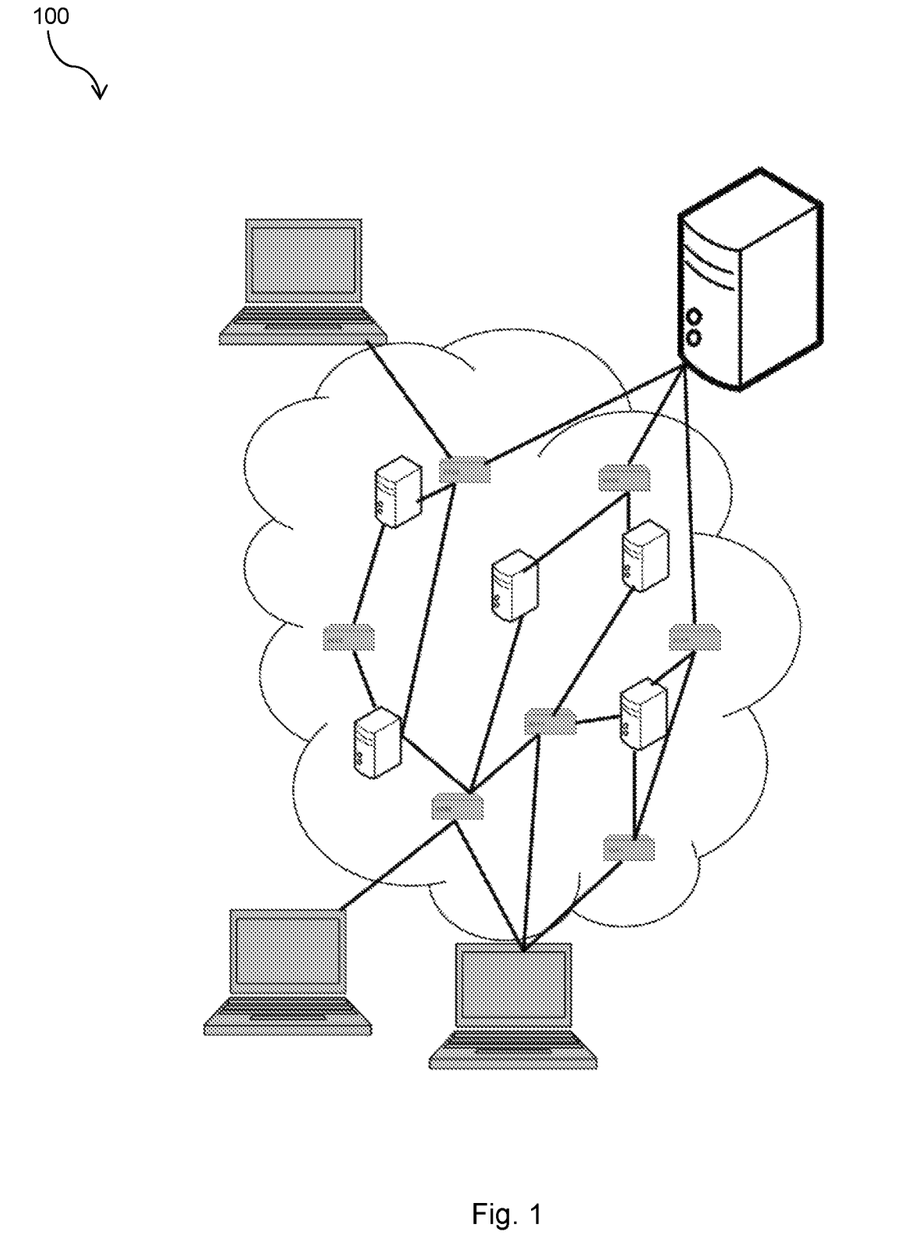
FIG. 1 shows an overview of a network in which embodiments of the present system may be implemented.
Figure 2:
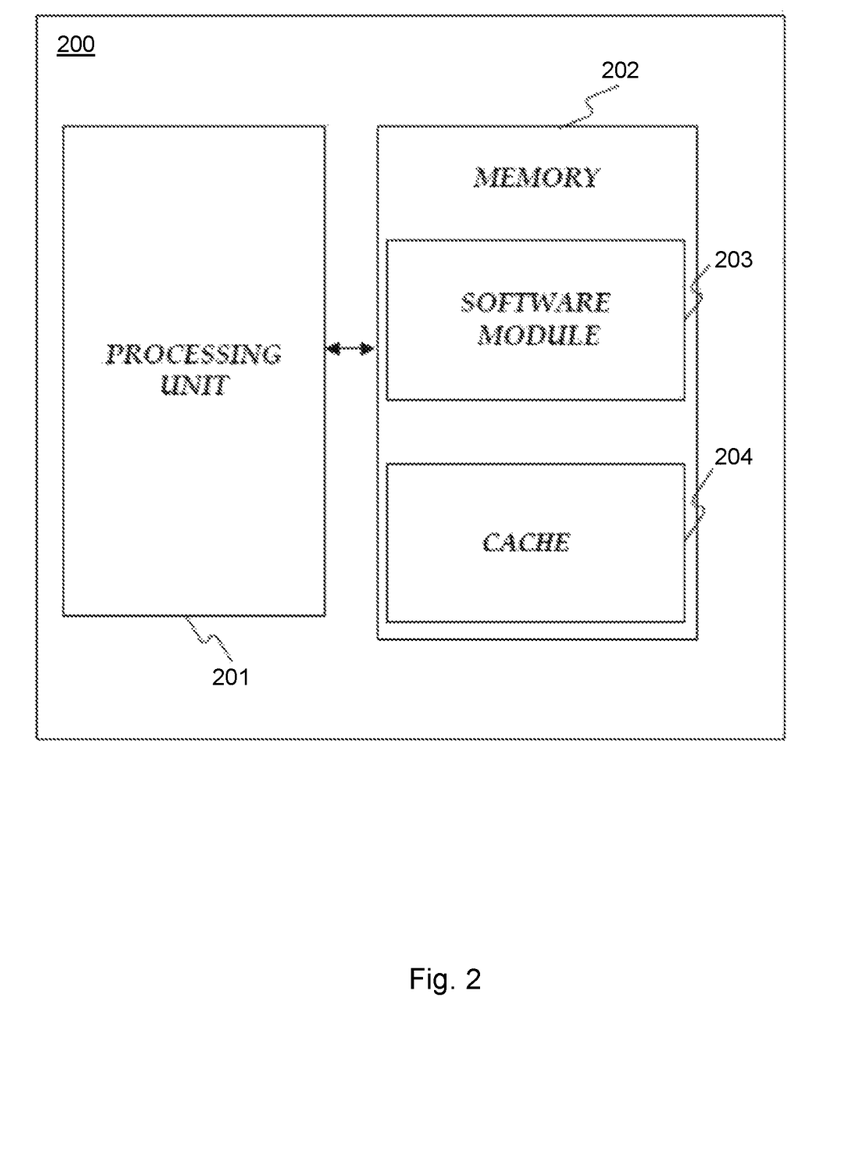
FIG. 2 shows a block diagram representative of a router or server.
Figure 3:
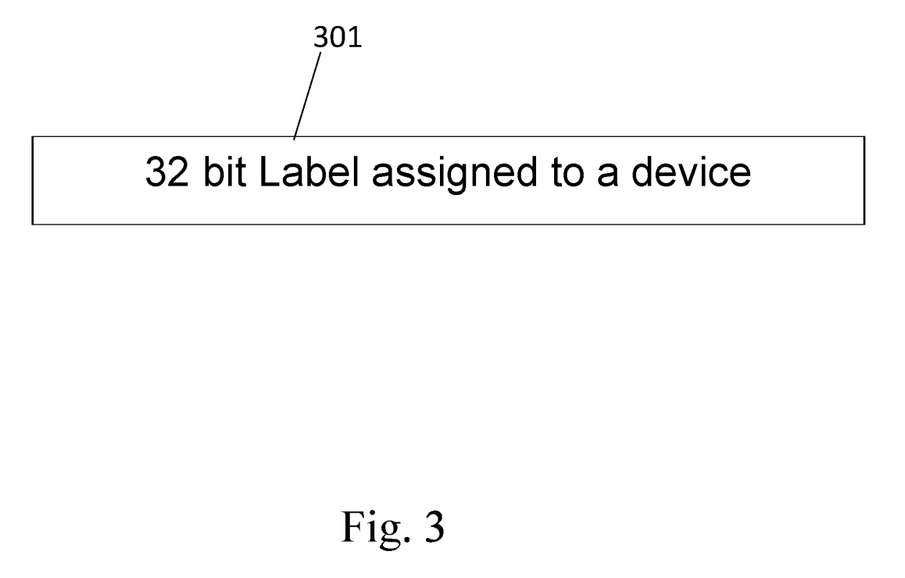
FIG. 3 shows a representation of an exemplary IPv4 header.

FIG. 1 shows a standard network configuration with end nodes, servers, switches and routers. FIG. 2 shows a block diagram of a server. The server has within it a cache memory that is used to store content that can be accessed by other nodes on the network. This memory is assigned by several algorithms, most commonly the content most recently requested by one of the end point nodes is stored.

This type of classical LRU transparent caching policy management may be used in the present system, but the skilled person will appreciate that other cache management methods may be more appropriate to a particular implementation FIG. 1 shows these endpoint nodes, which can receive data from a number of servers. In classical HTTP redirection if an end point node requests content the server will check its cache to see if it has the content stored; if it does not, it will redirect the request to another node. For example, it may redirect the request to a central node that is the provider of the content.

A server usually serves a plurality of endpoint nodes across the network as is shown in FIG. 1. This means that the server may have to deal with multiple requests at the same time. If these requests together ask for more resources than the server or network (e.g. network bandwidth) can provide, then load balancing may be required. Load balancing is where traffic from nodes is redirected and distributed across a group of servers so that the requests can be fulfilled. It may also be the case that the requests cannot be fulfilled. For example, many nodes may request a high quality of multimedia content and it may not be possible to deliver this simultaneously to all of the nodes. Therefore, an inferior level of content may be delivered to at least some of the nodes in order not to overload the network but nevertheless still transmit the content (albeit at a lower quality than requested) to the nodes.

IPv6

IPv6 is an updated version of the internet protocol and is intended to replace IPv4. IPv4 and IPv6 are not designed to be interoperable. IPv6 uses a 128-bit address and these addresses are represented by eight groups of four hexadecimal digits.

IPv6 networks provide auto-configuration capabilities, enabling automatic assignment of an IP address to a device for example based on the device's Media Access Control (MAC) address. IPv6 networks are simpler, flatter and more manageable, especially for large installations. Direct addressing of nodes from anywhere in the network is possible due to the vast IPv6 address space, which enable the use of globally-unique addresses, and the need for network address translation (NAT) devices is effectively eliminated.

An IPv6 address is designed to consist of two parts, a prefix that is used for routing and an interface identifier. For example, the prefix may comprise the first 64 bits of the 128 bit IPv6 address, while the interface identifier may comprise the final 64 bits of the address. The size of the two parts may be different. For example, one half may be larger. These are purely example sizes.

The interface identifier was originally designed to identify a host's network interface, for example by using a hardware address such as the MAC address of the interface. However, it has been appreciated that the interface identifier does not have to be used for this purpose. To this end some embodiments described herein utilise the interface identifier to identify content instead. Therefore, content will have its own IP address. This means that instead of routing to a particular node in the network, traffic will route to specific content. Large data files such as streams of media content, are often divided into chunks or segments of data as described below and, in this case, each chunk will preferably have its own address.

Figure 4A:
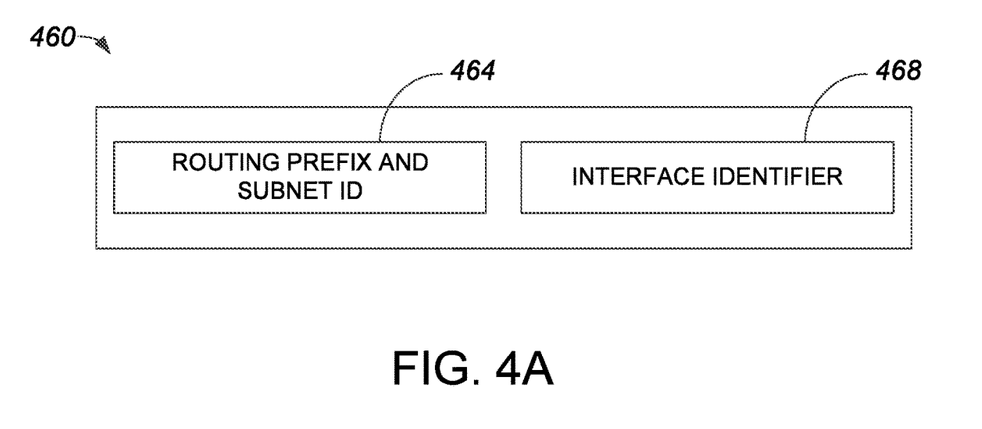
FIGS. 4A and 4B show diagrammatic representations of example IPv6 addresses in accordance with several embodiments.

FIG. 4A is an example of a diagrammatic representation of an IPv6 address that may be part of a segment list in a segment routing header in accordance with an embodiment. An IPv6 address 460 may include bits, e.g., 128 bits, substantially divided into a routing prefix and subnet identifier (ID) 464 and an interface identifier 468. In one embodiment, routing prefix and subnet ID 464 includes approximately 64-bits, and interface identifier 468 includes approximately 64-bits. An overall content description may be included in, e.g., coded in, interface identifier 468.

Interface identifier 468 will be described with respect to FIG. 4B in accordance with an embodiment. Interface identifier 468 may include, as shown, a stream type 470a, a service identifier (ID) 470b, a content descriptor 470c, and a chunk descriptor 470d. It should be appreciated that the number of bits included in interface identifier 468 may vary widely, and the number of bits allocated to stream type 470a, service ID 470b, content descriptor 479c, and chunk descriptor 470d may also vary widely. By way of example, interface identifier 468 may include approximately 64-bits, while stream type 470a may include 2-bits, service ID 470b may include 12-bits, content descriptor 470c may include 26-bits, and chunk descriptor 470d may include 24-bits.

Stream type 470a may describe a type of stream, e.g., a type of video stream. Types of streams may generally include, but are not limited to including, linear content such as television or live video content, non-linear content such as video-on-demand, user generated content (UGC), and corporate audio/visual content such as telepresence content.

Service ID 470b may identify service from any source, as for example a provider, an operator, and/or a channel. It should be understood that each source may generally have more than one service ID 470b. In one embodiment, when service ID 470b includes 12-bits, there may be up to approximately 4096 values for service ID 470b that correspond to each stream type 470a.

Content descriptor 470c may generally allow for the management and the identification of content associated with each value of service ID 470b. Examples of a suitable content descriptor 470c will be discussed below with respect to FIGS. 5A-C.

Chunk descriptor 470d is arranged to describe naming conventions for segments which make up, e.g., constitute, content such as a chunk of video. As will be understood by those skilled in the art, chunk descriptor 470d describes naming conventions for segments which make up content. In general, chunk descriptor 470d also facilitates the implementation of caching strategies such as automatic predictive caching. Chunk descriptor 470d may have approximately the same structure as content descriptor 470c, although chunk descriptor 470d and content descriptor 470c generally include different, substantially independent, information. One example of a suitable content descriptor 470c will be described below with reference to FIG. 6.

Figure 5A:
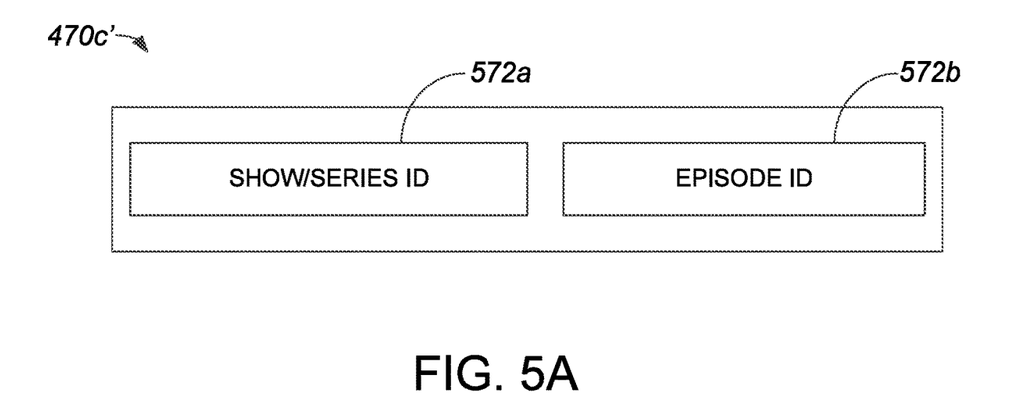
FIGS. 5A-C show diagrammatic representations of suitable content descriptions in accordance with exemplary embodiments.
Figure 5B:
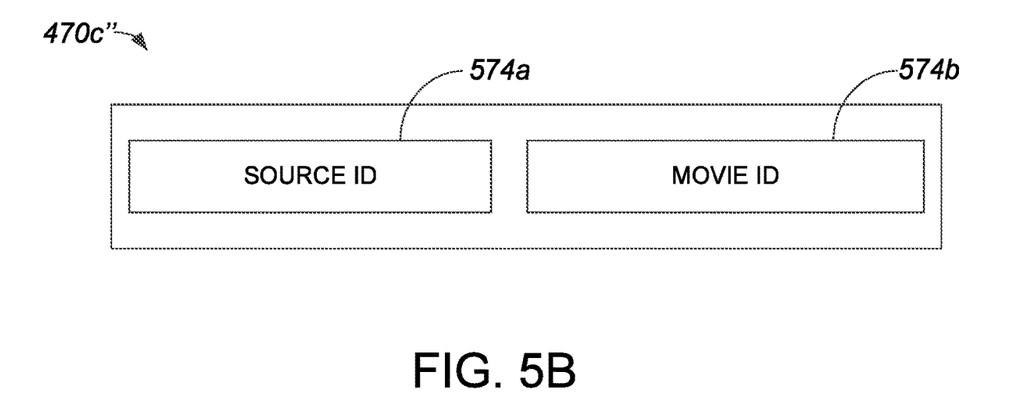
Figure 5C:
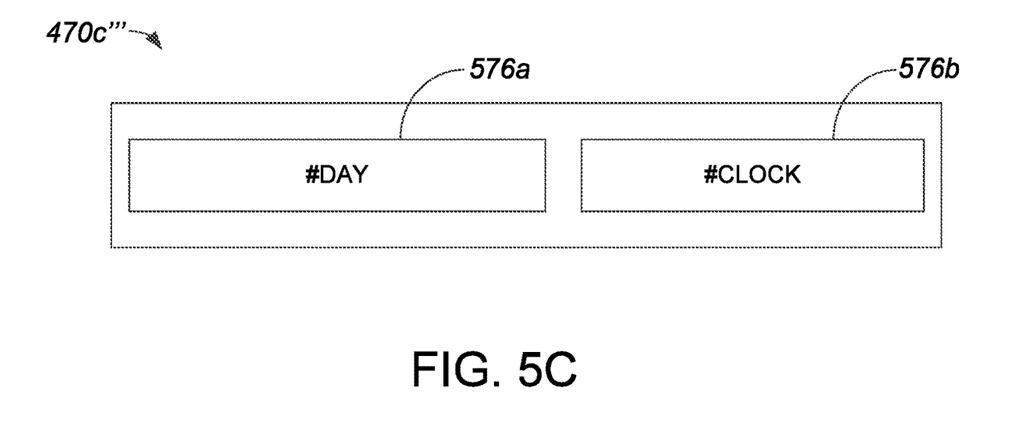

Referring next to FIGS. 5A-C, examples of suitable content descriptors 470c will be described. Using IPv6 address bits as a content descriptor effectively exposes significant properties of content to lower level layers of a network, and may also facilitate the implementation of caching strategies such as automatic predictive caching. It will be appreciated that FIGS. 5A-C simply suggest example content descriptors. Other bit arrangements would work equally well; however, in the examples given, some bits are used to indicate the "quality" and these quality bits are visible and interpretable by all parties involved in the process.

Figure 4B:
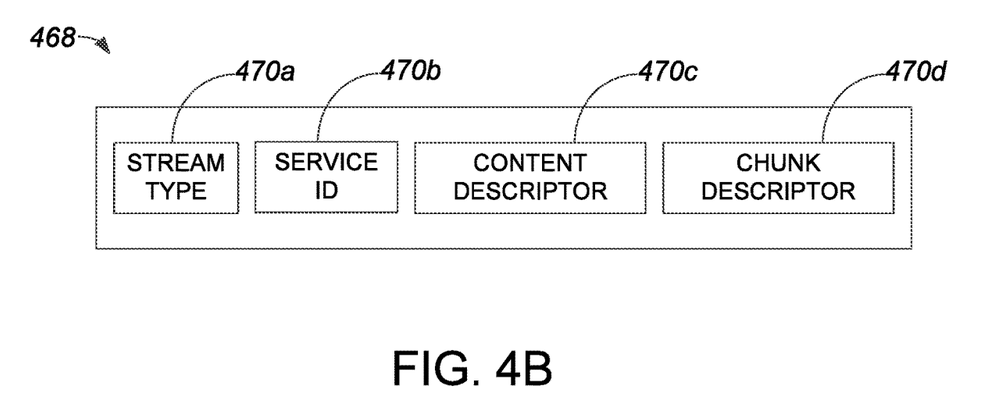

FIG. 5A is a diagrammatic representation of a first suitable content description, e.g., content descriptor 470c of FIG. 4B, in accordance with an embodiment. When content is associated with shows or series associated with a service or channel ID, bits of a first content descriptor 470c' may include a show or series identifier (ID) 572a and an episode ID 572b. The number of bits associated with show or series ID 572a and episode ID 572b may vary widely. In one embodiment, show or series ID 572a may include approximately 16-bits and episode ID 572b may include approximately 10-bits.

When content is associated with movies, a content descriptor 470c'' may include a source identifier (ID) 574a and a movie identifier (ID) 574b, as shown in FIG. 5B. In one embodiment, source ID 574 may include approximately 12-bits and movie ID may include approximately 14-bits.

FIG. 5C is a diagrammatic representation of a third suitable content descriptor in accordance with an embodiment. A content descriptor 470c''' may be suitable for managing a flow per minute in a day. Content descriptor 470c''' may include a # day 576a and a # clock 576b. # day 576a identifies a number of days starting from a fixed date, e.g., a conventional fixed date, and # clock 576b identifies a time. In the described embodiment, # day 576a includes approximately 15-bits and # clock 576b includes approximately 11-bits. As # day 576a generally identifies a number of days starting from a fixed date, # day 576a effectively enables an actual date to be determined.

Domain Name System

The DNS is a decentralised naming system for nodes connected to the internet. It is used to associate URLs or domain names with IPv4 addresses. DNS can be implemented to work the same way with IPv6, however now it can also associate content, or a combination of content name and URL with an IPv6 address.

Segment Routing

One way of requesting content in an IPv6 network is to use segment routing. Segment Routing (SR) allows an IPv6 or Multiprotocol Label Switching (MPLS) packet header to encode a list of explicit waypoints, e.g., multiple nodes, rather than a single destination. Such waypoints may be used to route packets through a specific service or application.

Accessing a particular service hosted on any one of a list of servers, however, is time-consuming and inefficient.

Storage and Retrieval of Media Content in a Network

Media content (both audio and video) can be divided into chunks or segments for both storage in and delivery over a network. In that way, for example, media content that can be of many hours' duration (such as a film or broadcast of a sporting event) can be divided into a number of segments of shorter playback time (such as between 2 seconds and 30 seconds).

The short playback time can allow fast switching between qualities or "representations".

When a network device, such as a client end user device, requests particular media content, such as a particular video file, it obtains all of the chunks of data that make up that media content.

One way of streaming media content using chunking is to use a technique such as Dynamic Adaptive Streaming over HTTP (DASH), which allows adaptive bit rate streaming of media content, stored as chunks in a network one or more HTTP servers, to a network destination requesting the data. Another example protocol that can be used for content streaming is HTTP Live Streaming (HLS) and the mechanisms described below are equally applicable to HLS as well as to other streaming protocols and mechanisms.

Prior to storage, the media content is divided into shorter chunks or segments and alternative versions of each chunk are stored at various servers in the network. The alternative versions may be, for example, encoded at different bit rates or may have different formats for playback through a variety of different end user devices (Internet connected TVs, set top boxes, mobile devices including smartphones, laptops etc.)

When the content chunks are created, a DASH manifest file is also created, which identifies the chunks of data necessary to recreate the whole stream of media content, including details of alternative chunks (for example those that are encoded at different bit rates). An equivalent HLS file is the M3U file.

Separate DASH manifest files may be created for different formats or encodings of a particular stream of media content, such that a set top box would be working from a different DASH manifest to that used by a smartphone.

The DASH manifest typically also includes an indication of the location of each of the chunks. However, when dealing with consecutive or aggregate chunks, a manifest template can be used to group multiple chunks that follow a regular format into one description. This can enable easier parsing of the manifest file.

Based on the manifest, the end user device can retrieve and reconstruct the full media content at the highest bit rate currently available to it over the network. In particular, the end user device can obtain subsequent chunks identified in the manifest while decoding and displaying a current chunk.

ABR in an IP Network

In classical or legacy networks, such as an IPv4 network, it is common practice for an endpoint device (such as a user device) to request content at a particular level of quality. A user will usually request the highest quality available to them in order to have the best viewing experience.

This however has many drawbacks. For instance, in a crowded or overused part of the network, or at a particularly busy time, the network may not be able to provide the device with the content at the requested level of quality. This leads to the device having to re-request the content at a lower quality level.

It also has many unintended consequences. For instance, now that watching television on a computer is increasingly common, when a program is on with a wide viewership (for instance an England or West Ham United football match) a large amount of devices will request the highest quality of content at the same time. This will overload the system and will lead to these same devices then requesting the lower quality version of the content at the same time. This potentially leads to underutilising the network capacity and in turn this can lead to oscillation between all of the devices requesting the higher and then lower quality versions of the content. This is highly disruptive for both the network and also for the users.

In an IPv6 network each piece of content can be assigned a corresponding IP address. This address can include anonymous profile bits. These can give a special profile value that corresponds to one or more attributes of the content that the address corresponds to. For example, in one embodiment the anonymous profile bits can correspond to one or more of the quality, duration, resolution, encoding scheme or other parameters related to the specific content.

In particular, the addresses containing the anonymous bits are routed by the network towards a server (or plurality of servers) advertising those addresses, or address prefixes, containing wildcard bits. Wildcard bits have a known configuration or value, for example a null value. Put another way, when a request which includes anonymous bits is sent to a network, delivery servers within the network interpret the request as a request for any content which has an address corresponding to the request, discounting the anonymous bits. As an example, if the request comprises anonymous bits only in the portion of the address corresponding to the quality of the content, the network ensures that the other parameters of the address such as chunk identifier, resolution, duration etc. match the request, but allows the served content to have any value. That is the served content and the requested content may not have addresses which match completely, but may nevertheless be treated like a match by the network if the non-matching bits of the address of the content correspond to anonymous bits in the request.

In this example, the network can choose which version of content to serve. In particular, the quality of content supplied can be selected by the network to ensure that each client who is requesting content receives the best quality that the network can deliver, having regard to the available bandwidth. Another way of looking at this is that each node requesting the same piece of content (but without specifying e.g. the quality) is treated as an aggregated single client which requires one copy of the content per node. The network knows the available bandwidth, and that it must supply one copy per node, so the quality deliverable can be calculated by dividing the bandwidth by the number of copies to be supplied. This allows the network to average out the bandwidth across the aggregate of the requesting nodes, while reducing the occurrence of oscillations in quality delivered, as described above.

It is noted that the address provides information useful to the network in making appropriate decisions to deliver best possible or most suitable quality. Content servers could also still receive requests for explicit quality alongside anonymous requests and can handle load balancing of any conflicting demands.

To restate, "addresses" representing requests for content are used by the "network" to route those requests to appropriate servers and the servers themselves use the same addresses to select the content to deliver. This latter decision can be more sophisticated when the said addresses refer to an anonymous version of the content.

In this example, when a device receives an IPv6 address configured for this embodiment the requesting device does not specify the quality of the content from the address. This means that the decision of what quality of content is distributed to a device is taken away from the device itself and is given over to the network. Of course, in other examples, it may be desirable to provide anonymous bits in other parts of the address, to allow the network to choose other parameters of the content. For example encoding type or resolution may be determined by the network based on various parameters.

As used throughout this description, addresses including anonymous bits may not actually represent an actual or real piece of content. That is, there may be no piece of content in existence whose address matches that of a request which includes anonymous bits. Instead, the content represents that an entire class of pieces of content are being requested. In the above example, the class of content would be defined by all pieces of content having a particular specified chunk ID, duration, encoding etc., but any quality. For example, a request for a piece of content having an anonymous quality may specify that the network should return the first chunk of the second episode of the third series of a particular television show, encoded in a specific MPEG format, with a screen resolution of 640×480 pixels, but that any quality of content (which may include varying the frame rate, audio quality etc.) may be delivered to the user.

This is highly advantageous because it means that other devices in the network, such as routers or servers that have much more information of the networks capabilities can control the level of content delivered to an end device.

For example, a router or a server can monitor the bandwidth available to all of the users and can then choose a version of the content that will enable all of the endpoint devices to receive the content without disruption.

Each router or server may have a cache as is shown in FIG. 2. This cache may have one or more copies of the requested content at several different quality levels. The server or router may receive a request for content from the requesting node. The request may comprise the IP address associated with the content requested, and also comprise anonymous bits in part of the address relating to a parameter of the content, as described above. The server or router then identifies which versions of the requested content it has stored based on the IP address. The server or router then determines a version of the requested content to send. This determination can be based on one or both of: the qualities of the versions available; and the current network delivery capacity to the requesting device. The server or router then performs network address translation of the requested IP address to the IP address of the determined version of content that is to be sent. This version of the content is then sent to the requesting node.

This demonstrates that the server or router receiving the request takes into account both the network capabilities but also takes into account the content that it has stored. For example, if there is very little traffic flow on the network (say it is very late in the evening) and someone requests a film the server may have several versions of the film that it could send to the requesting node. However, in these circumstances the server or router would choose the version of the content with the highest quality so that the user has the best viewing experience, despite this representing a heavy bandwidth usage by that user. If instead the user had requested the film around half past six in the evening at the peak time of internet usage the outcome may have been different, and a lower quality version of the content may be served, to allow each network user to have a reasonable (but not excessive) bandwidth allocated to them.

The server or router may have determined that if all the users requesting content at this time received the highest quality of content available then the network would simply cease to function at this would exceed the bandwidth limitations. In order to prevent this, the server or router would instead send the highest quality version of the content that would not exceed the bandwidth. This means that all of the users would receive an average quality of content. This is fairer to all of the users and stops the oscillations occurring as discussed above.

As the IPv6 address is comprised of 128 bits it can be partitioned into two portions. For example, the first portion has 64 bits and is used for routing. The second portion also has 64 bits; however this is used to identify the piece of content.

Upon determining the version of the content that is to be sent to the requesting the node the server or router may retrieve this version from its memory in order to queue it for sending. Alternatively, upon identifying versions of the requested content stored on the server or router the server or router may retrieve all of the versions and queue them for sending. Once the determination is made the unwanted versions could then be deleted from the queue. Either embodiment would facilitate the determined version of the content being sent from the server or router to the requesting node.

The step of determining a version of the requested content to send may involve asking other servers or routers if they have a specific version of the content corresponding to an appropriate quality. Alternatively, the server may ask other servers if they have further versions of the requested content, or if they have a higher quality version of the requested content. The last option may be particularly advantageous if one node has paid more in order to receive a better service. Instead of asking other servers the determining server may simply listen for other servers advertising the content. Alternatively, the server can create the deliverable quality on the fly from a highest quality master copy known as a mezzanine file, by downscaling the quality of the chunks to the determined maximum quality based on current network conditions.

The routing to another router or server may be done via the shortest possible path.

The server may receive multiple requests from multiple requesting nodes, for either the same, or different content, at the same time. It may be advantageous to deliver content that to these users so that all of the content stays at approximately the same level for a duration of time in order to avoid oscillations.

The requesting node may correspond to the source address of the requesting IP address.

When the server or router determines the version of the content to send it may send the highest available quality version of the content if there are no network limitations. Alternatively, it may send a version of the content that enables the bandwidth restriction to not be exceeded. Alternatively, the server or router may determine how much bandwidth can be allocated to each requesting node. The server or router can then determine how much bandwidth each version of the requested content would need. The server or content can then choose the version of the content that is the highest quality of all of the versions that fall below the threshold of available bandwidth. This ensures that the best average quality is sent to all of the requesting devices.

The server is configured to process contents requests. The requests comprise the IP addresses received at the server that correspond to the content requested. The IP address further comprising bits comprising information related to only one or more of the duration, resolution and encoding scheme of the content. The server is configured to perform the method steps discussed above.

Logic encoded on one or more tangible media for execution and when executed operable to perform the method discussed above. This logic may be stored on the server.

Figure 6:
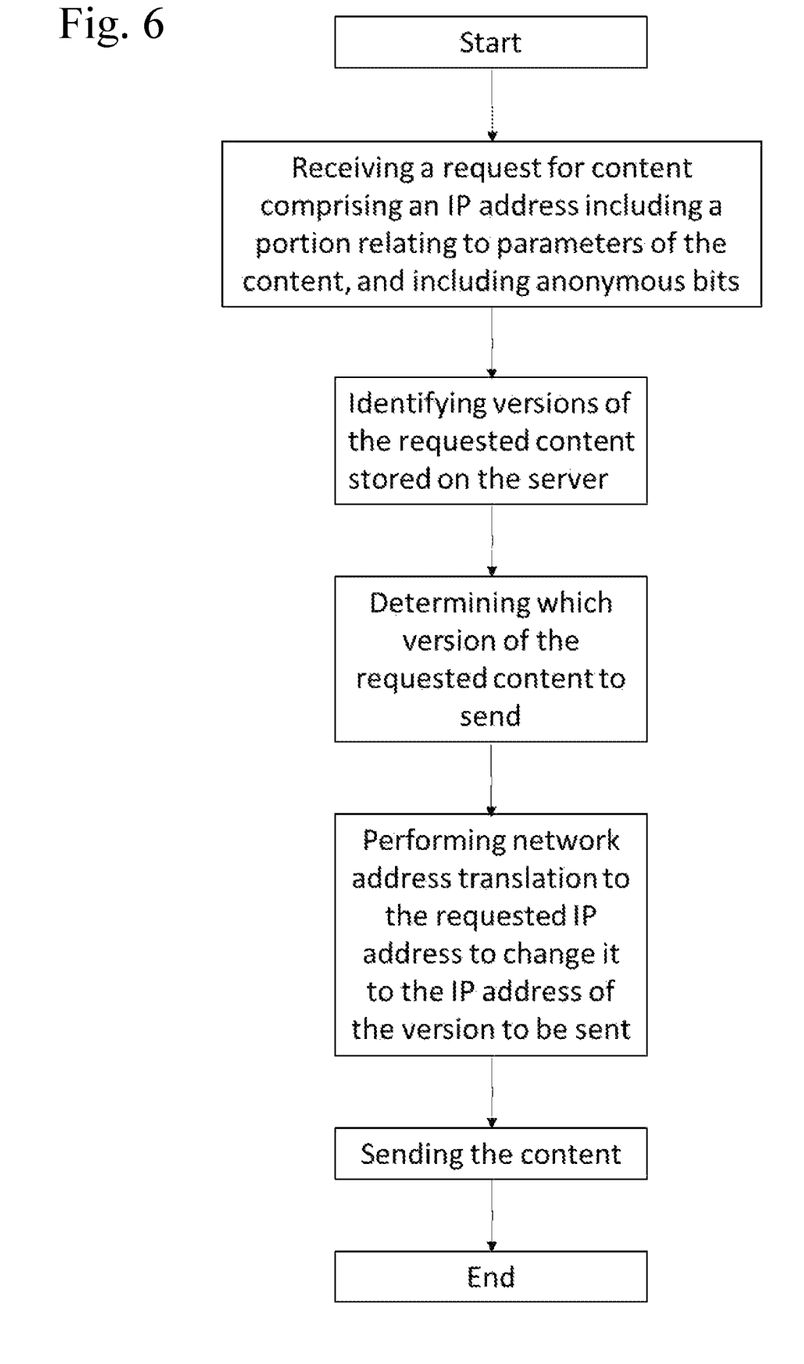
FIG. 6 shows a flow diagram of a method according to one embodiment.

FIG. 6 shows a flow diagram corresponding to a method for determining which version of content to send to a node. As can be seen in the figure a request is received by the server and this request comprises an IP address, wherein the IP address includes a portion relating to parameters of the content, and the portion relating to the parameters includes anonymous bits, as described above in detail. The server then identifies the requested content stored on the server and then determines which version of the content to send. The server internally performs a reverse network address translation (NAT) to map the requested address to the determined version.

The requested content may comprise an IP address that represents the content, but has anonymous bits in the portion of the address which correspond to the quality of the content. This means that the quality level is not specified by the requesting device. When the server performs reverse address translation the anonymous quality level is matched to an actual quality level (the quality level of the determined version). The anonymous bits representing the quality level are interpreted as meaning that several different actual quality levels will satisfy the request.

The above description addresses the problem of choosing a version of content when a request for the content has been received at a server or router. Another related problem is how to get the request from a requesting node to the most appropriate server. This cuts out unnecessary steps in determining that other servers have more appropriate versions of the content, and also makes the process of choosing the content more efficient and more likely to result in the node receiving a higher quality version of content.

Therefore, a method of routing a request for content to a selected cache is described. Such a method may comprise routing a request for content to a requesting node to a cache that has at least one copy of the content requested stored. This request may comprise an IP address corresponding to the content requested. The routing may be based on the content of a plurality of caches.

As stated above the IP address may be an IPv6 address and therefore would comprise 128 bits. These bits may be split into two sections, the first 64 bits comprise a first half that corresponds to routing information and the second half comprises 64 bits that correspond to identifying the content requested. There could be other configurations or bit ratios used. For example, the first portion could comprise more or less than 64 bits, with the remainder being the second portion, which therefore comprises respectively less or more than 64 bits.

The routing information is not limited to the upper 64 bits. The system routes on prefixes in which case "largest prefix match" defines which route will be taken by the request.

One possible embodiment further comprises the plurality of caches advertising the content they have stored regularly so that the requesting node can route the request for content to the most appropriate cache. This method involves a large amount of traffic being sent around the network, however it also enables requesting nodes to route their requests intelligently. This can decrease traffic and latency. Therefore, overall this method is an improvement on the current system.

An alternative embodiment the caches advertise the content they have stored only to routers and other caches nearby. These routers and other caches are configured to redirect the request to a cache that has advertised that it has a copy of the requested content stored. This means that once a request enters the network it is efficiently routed to a nearby cache that has a copy of the requested content. As the request does not specify the quality of the content it is requesting any server advertising a route to this profile prefix is a/113, and has a length of 113 bits, (if the chunk id is 15 bits) is known as being capable of delivering the requested content. It may or may not specify the quality of content it can provide.

A server having different qualities in its cache can start advertising for this 113-bit prefix but may also stop advertising the contents. This could be for several reasons, including having too high a level of traffic to accept more requests.

In this example, the advertisement of the content may include advertising an address for content comprising anonymous bits in a portion of the address relating to a parameter of the content. In this case, devices seeking a piece of content are provided with an address to request that content that does not specify certain parameters, e.g. the quality of the content, due to the presence of the anonymous bits. This ensures that control of the quality of content delivered (or control of other parameters, depending on the specific implementation) remains in the control of the network, rather than users.

The request itself may be configured to segment route via the local caches, or at least a local cache, to the source provider. Therefore, the request may find that the local cache has the content, or that it knows a nearby cache that has advertised that it has the content and therefore does not have to route as far. Alternatively, if none of the local caches advertise that they have the requested content stored then the request is still configured to route to the source of the requested content. Clearly the source is very likely to have a copy and therefore the probability of finding a copy of the content is increased by utilising this approach. The initial destination address remains the same during the whole process.

If several nearby caches advertise that they have at least one copy of the content requested there are several ways of determining which cache to route to in order to find the most appropriate copy of the requested content. One is simply determining which of the caches advertising the content has the shortest path length either from the cache or router determining, or to the requesting node. Other methods may route to caches with the least traffic. These methods may be used to reduce the global throughput.

Another method may be determining which of the caches has the highest range in qualities of the versions of the content it has stored. This is advantageous because it means that it is very likely that regardless of network conditions the cache will have at least one version of the requested content appropriate to send to the requesting node.

Another method may be to route to the cache with the highest quality version of the requested content. This may be appropriate at off peak hours when there is a low level of traffic or for customers that have paid more for a premium service.

Servers advertise the route to the anonymous version and not routes to specific versions of the requested content so the client does not know a priori what any particular server actually has in its cache. The idea is that servers advertising routes to anonymous content versions will do it only under certain conditions such as e.g. they at least have 3 or 5 different qualities in stock.

Alternatively, a method may be to route to the cache with the lowest quality version of the requested content.

This may be appropriate at peak hours when lower quality content may be the only content that can be sent to a large amount of users. It may also be advantageous when providing content to a customer who has paid for a budget service.

In addition, the network may be arranged so that certain nodes, or even every node, are initialised with a large amount of content in a low quality format. Such nodes may be referred to as distribution caches. Storing low quality versions reduces the storage space required for each piece of content, and increases the number of different pieces of content that can be stored there, meaning that a user's request does not have to travel far before content is delivered to them, since a distribution cache can supply virtually any content requested of it from its local storage, albeit in a low-quality format. When a user makes a request as described herein, for example having anonymous bits in the part of the address relating to quality, the distribution cache is able to respond, as the request does not specify quality, instead indicating that any quality is acceptable. The low quality local copy of the content is therefore served to the user.

However, assuming that there is network capacity for a higher quality of content to be delivered, this is desirable. Therefore, while the first chunk (corresponding for example to a chronologically first piece of content—the initial parts of a video or audio file, for example) will be served as low quality, the request for a first chunk may trigger the distribution cache to request higher quality versions of chronologically subsequent chunks from other network nodes, or even from the central server of a content provider.

For example, as described above a 2-hour movie may be divided into chunks of about 2 to 30 seconds, or into between 240 and 3600 chunks, e.g. a first chunk may comprise the first two seconds of video (and audio), a second chunk may comprise the video between 0:00:02 and 0:00:04, and so on until the movie has been completely divided into chunks (also known as having been chunked). When a user requests to view this movie, the first chunk is provided from the distribution cache. In the current example, this may be in the lowest quality. While this chunk is being served, the distribution cache requests a higher quality version of the second, third, fourth . . . , and $n^{th}$ chunks, where the $n^{th}$ chunk is the chronologically final chunk. The specific quality of chunk requested by the distribution cache is determined based on knowledge of the network capacity, and other factors, as described above.

In the event that the chronologically subsequent chunk (in this case the second chunk) arrives before the user has finished viewing the most recently received chunk (in this case the first chunk), and there is also sufficient time for the user to download the chronologically subsequent chunk, then the distribution cache may send the user the higher quality chronologically subsequent chunk. If this chunk does not arrive in time, the lower quality chunks will be sent until the distribution centre has received sufficient high quality chunks to effect the switch over to high quality chunk delivery described above.

Once the higher quality chunks have been sent to the user, the cache may retain the higher quality versions (including filling in any gaps, for example requesting a high quality version of the first chunk), or delete them, depending on the protocols in place. For example, popular content may be retained, while less popular example may be deleted.

Using this system, anonymous bits in the addresses of data may be used to provide a flexible network which provides highly distributed content, so that a local node may be able, in principle, to supply any content which may be requested of it. The downside of this is that the quality of that content may initially be low. By ensuring that content requests include anonymous bits in the quality part of the address, the switch can be smoothly made between high and low quality content as the distribution cache backfills its storage with higher quality content.

Alternatively, another method may be to route to the cache that has the most copies of the requested content. This may be advantageous because if there are more copies of a piece of content available one of them is likely to be closer to the maximum quality that can be transmitted to the requesting node (the limit imposed because of bandwidth or other network considerations).

The routing decision leading to determine the most appropriate cache can be made by managing the data plane routing tables. A control plane could do this centrally, or locally by either being hosted on or connected to a number of different nodes.

An apparatus configured to perform the method steps discussed above is envisaged in the present invention. This apparatus may be a router, cache or server in the network.

Logic encoded on one or more tangible media for execution and when executed operable to perform the method discussed above is envisaged as part of the present invention. This logic may be stored on the server or on another network element such as a router. Alternatively, such logic may be used in a control plane. Such a control plane could be centralised or distributed around the network.

Figure 7:
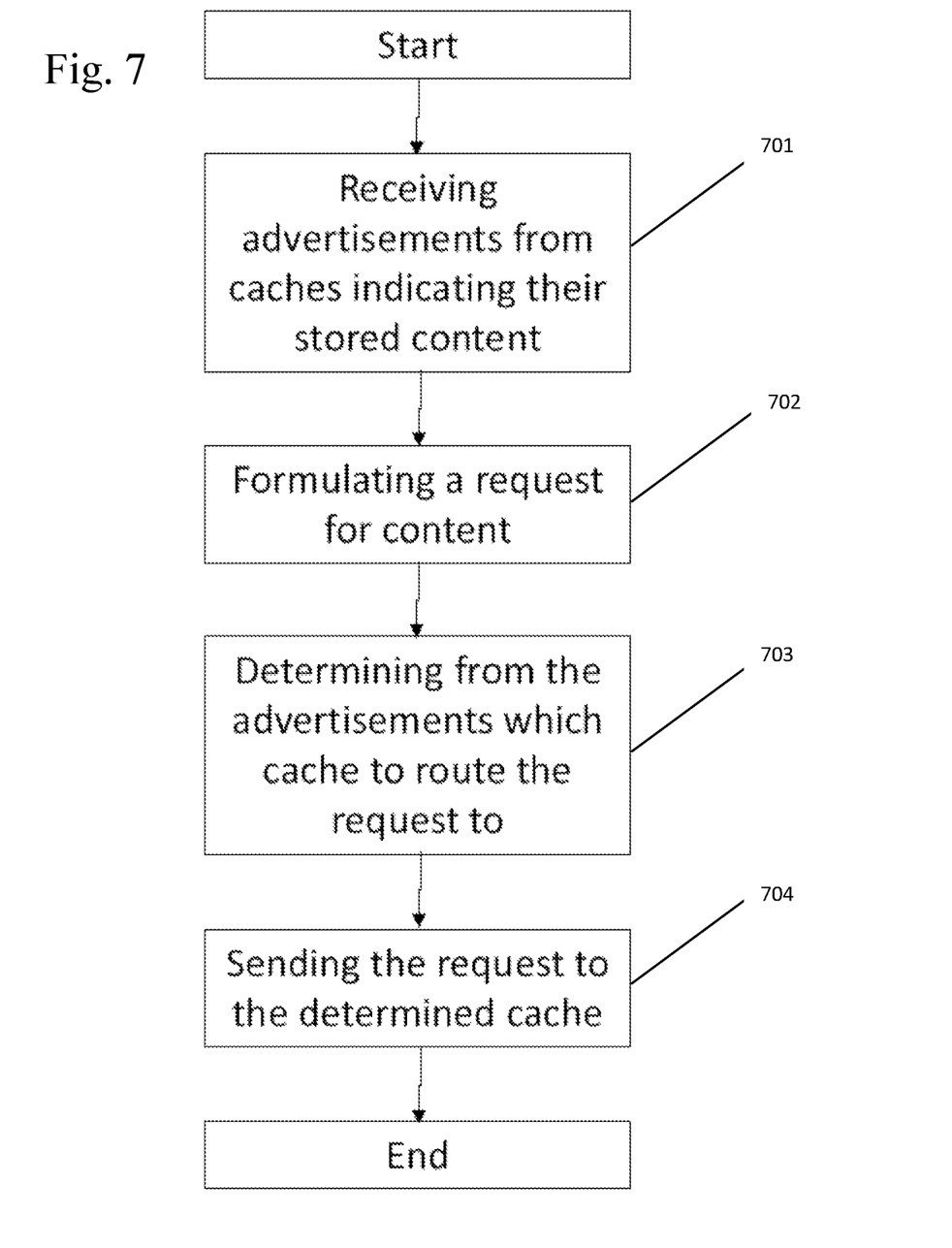
FIG. 7 shows a flow diagram of a method according to a further embodiment.

FIG. 7 shows a method performed at a requesting node for deciding where to route a request for content to. The node receives advertisements from local caches that detail the content that they have stored. The requesting node then formulates a request for content. This is typically based on a user query or action. The requesting node then determines which of the caches to send the request for content to. This is based on the advertisements it has received. For example, the node may cross reference the content it is requesting with the content advertised. It may then choose between a plurality of caches advertising the requested content based on a variety of factors. Once the node has decided where to route the request it then sends the request to the determined cache.

The apparatus then determines from the received advertisements which caches have a copy of some variants the content. If more than one cache has a copy several measures may be used to determine which cache is the most appropriate. This may be based on the quality or quantity of the requested content advertised. Alternatively, it may be based on network characteristics. When the most appropriate cache is determined the request is forwarded there.

The present disclosure also envisages one or more computer programs, computer program products or logic encoded in computer-readable media for implementing any method claimed or described herein. It will be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

Throughout the description, references to components or nodes of the network should be construed broadly, and in particular may comprise several subcomponents or modules working in combination to achieve the stated effects. These subcomponents may themselves be implemented in hardware or software. Likewise, many different components may be combined together as one component, for example a single processor may carry out many functions simultaneously. Similarly, any reference to operational steps may comprise hardware, software, or a combination of the two. As already noted, any method described herein, or any part thereof may be carried out by a computer program, or a computer program product.

References herein to components being connected to one another should be interpreted as meaning either directly connected, or indirectly connected, for example being connected via other components. Indeed, in the case of complex networks, components may be both directly and indirectly connected to one another. Examples of such connection may commonly include, but are not limited to: electronic connections through wires or cables; fibre optic connections; and wireless communication, for example via radio waves, microwaves or infrared.

In the present disclosure, references to networks should be interpreted broadly. In particular, the internet is often used as an example of a network, but is not limiting. The principles set out herein are applicable to all networks, comprising a collection of processors connected to one another. Connection may be direct, or via switches and routers. The network may further comprise servers and caches, depending on the exact nature of the network. When storage is discussed herein, this may include, without limitation one or more of magnetic, optical, solid state, volatile or non-volatile memory.

The steps associated with the methods of the present disclosure may vary. Steps may be added, removed, altered, combined, and reordered without departing from the scope of the present disclosure. Indeed, different aspects and embodiments of the disclosure herein may be combined with one another, in any combination and may be implemented in conjunction with one another in a particular network. In particular, individual components, and systems of components may be combined, the tasks of a single component divided between many subcomponents, or equivalent components interchanged without departing from the principles set out herein. Furthermore, features of one aspect may be applied to other aspects of the system.

Therefore, the present examples are to be considered as illustrative and not restrictive, and the examples are not to be limited to the details given herein, but may be modified within the scope of the appended claims.

The invention claimed is:

1. A method of serving a version of a piece of content from a server to a requesting node, the method comprising:
   receiving at the server a request for the piece of content from the requesting node, wherein the request comprises an IP address associated with the piece of content, wherein the IP address of the request includes one or more portions relating to one or more parameters associated with the piece of content, and wherein at least one portion comprises anonymous bits;
   identifying a plurality of versions of the piece of content, wherein each identified version has an IP address with portions matching the corresponding portions of the IP address of the request, except for the at least one portion comprising anonymous bits;
   determining at the server a version of the piece of content to send; and
   sending the determined version to the requesting node.

2. The method of claim 1, wherein the determining is based on one or more of:
   the versions of the piece of content available; or
   the network delivery capacity to the requesting node.

3. The method of claim 1, wherein a portion of the IP address comprising anonymous bits is a portion of the address relating to the quality of the piece of content.

4. The method of claim 1, wherein the requested IP address is an IPv6 address.

5. The method of claim 4, wherein the requested IP address comprises a first portion used for routing and a second portion used to identify a piece of content.

6. The method of claim 1, wherein determining a version of the piece of content comprises routing the request to another server that advertises it has a higher quality version of the requested content.

7. The method of claim 1, wherein the requesting node corresponds to the source address of the requesting IP address.

8. The method of claim 1, wherein the determined version of the requested piece of content corresponds to the highest available version at the server.

9. A method of advertising pieces of content to a network to allow the network to adapt the content served by the network to changing network conditions, the method comprising:
advertising an IP address associated with a piece of content, wherein the address includes one or more portions relating to parameters associated with the piece of content, and wherein at least one portion comprises anonymous bits;
wherein the anonymous bits are arranged to be interpreted by the network as allowing the network to serve any one of a plurality of versions of the piece of content, wherein each of the plurality of versions has an IP address with portions matching the portions of the IP address of the request, except for the at least one portion comprising anonymous bits.

10. The method of claim 9 wherein each of the plurality of versions has an IP address matching the IP address of the request, except for the at least one portion comprising anonymous bits.

11. The method of claim 9, wherein the at least one portion comprising anonymous bits is associated with the quality of the piece of content.

12. The method of claim 9, wherein the address is an IPv6 address.

13. The method of claim 9, wherein the advertised IP address comprises a first portion used for routing and a second portion used to identify a piece of content.

14. The method of claim 13 wherein the second portion further specifies parameters associated with the content.

15. A method of delivering a piece of content in response to a request, the method comprising:
routing a request for a piece of content from a requesting node to a distribution cache, wherein the distribution cache is arranged to store pieces of content having a preselected level of quality, wherein the request comprises an IPv6 address associated with the piece of content, and wherein the IPv6 address includes a portion relating to parameters of the piece of content;
serving a first piece of content having the preselected level of quality from the distribution cache to the user, irrespective of a quality requested by the user;
identifying related pieces of content associated with the first piece of content; and
requesting at least one further version of the related pieces of content be sent to the distribution cache, the further version having a further quality.

16. The method of claim 15, wherein the IPv6 address of the request comprises bits comprising information relating to one or more of the duration, quality, resolution and encoding scheme of the first piece of content.

17. The method of claim 15, wherein the request comprises anonymous bits in at least one the portion of the IPv6 address, which the distribution node interprets as a request for any available quality of the first piece of content.

18. The method of claim 15, wherein the first piece of content having the preselected level of quality is served from the distribution cache to the user, irrespective of the requested quality, due to the distribution node ignoring all bits relating to quality in the IPv6 address of the request.

19. The method of claim 15, wherein the IPv6 address comprises a first portion corresponding to routing information and a second portion to identify the piece of content.

20. The method of claim 15, wherein routing a request comprises the plurality of caches advertising the content they have stored so that the request for content is routed to a distribution cache having the requested content.

* * * * *